Patented Oct. 14, 1952

2,614,093

UNITED STATES PATENT OFFICE 2,614,093

PREPARATION OF SYNTHETIC POLYMERIC MATERIALS

George L. Wheelock, Coventry Township, Summit County, Ohio, assignor to The B. F. Goodrich Company, New York, N. Y., a corporation of New York No Drawing. Application May 23, 1946, Serial No. 671,895

10 Claims. (Cl. 260—45.5)

This invention relates to synthetic polymeric materials, particularly synthetic polymeric materials closely resembling natural rubber in the raw uncompounded condition in strength and elasticity, and to a method of preparing the same, and it is especially concerned with the preparation of polymeric materials in which a major proportion of a rubbery copolymer of a butadiene-1,3 hydrocarbon and another polymerizable compound is uniformly and intimately combined with a minor proportion of a tough solid resinous polymer such as polystyrene.

It is well known that synthetic rubbers which are prepared predominately from a butadiene-1,3 hydrocarbon (often called butadiene synthetic rubber) such as the rubbery copolymers of butadiene-1,3 and styrene and the rubbery copolymers of butadiene-1,3 and acrylonitrile are generally much weaker and less elastic when vulcanized in a "pure gum" recipe (that is, a recipe which includes only the rubbery material and vulcanizing ingredients and is free from significant amounts of fillers, pigments, softeners, etc.) than is natural rubber. For example, pure gum vulcanizates of natural rubber possess a tensile strength ranging from 2,000 to 3,000 lbs./sq. in. or more and are highly elastic, whereas pure gum vulcanizates of such synthetic rubbers possess tensile strengths ordinarily less than 1,000 lbs./sq. in., and often as low as 200 to 500 lbs./sq. in., and a somewhat lower elasticity.

It is known that the compounding of such synthetic rubbers with carbon black prior to vulcanization, remarkably improves their tensile strength, to an extent even greater than it does with natural rubber, and consequently it has been possible, by using large amounts of carbon black, to manufacture articles from these synthetic rubbers of the required high tensile strength. But the addition of carbon black to these synthetic rubbers also produces other effects, some of which are quite undesirable in many applications. Besides producing a black coloration, which is undesirable for many purposes, the presence of carbon black renders processing more difficult, which is already more difficult than is the case with natural rubber; it increases the stiffness of vulcanizates, which is already greater than that of natural rubber; and it increases the hysteresis loss, decreases the resistance to flex-cracking, and lowers the electrical resistivity of the synthetic rubber. As a result the compounder of such synthetic rubbers must either use sufficient carbon black to attain the desired strength, even though the other properties produced may not be advantageous, or else not use sufficient carbon black and produce a weaker product than would be desirable.

It is, therefore, an object of this invention to modify raw synthetic rubber of the butadiene copolymer variety to render it more like natural rubber in processing when unvulcanized, and stronger and more elastic when vulcanized without the addition of carbon black. Further related objects are to permit the obtainment from such synthetic rubbers of light and brightly colored compositions of high strength and elasticity free from carbon black, and to improve the properties of such synthetic rubbers when compounded with carbon black. Other objects will be apparent hereinafter.

Numerous attempts have already been made to attain these objectives but heretofore no butadiene-1,3 copolymer synthetic rubber which is vulcanizable with sulfur to a tensile strength over 1,000 lbs./sq. in. without the addition of carbon black or inorganic reinforcing pigments (which are less effective than carbon black in producing high strength yet generally possess all of the disadvantages of carbon black except the black coloration) has been developed.

I have now discovered, however, that these and other objects are attained and that rubbery synthetic polymeric materials closely resembling natural rubber in that they may be processed easily and then vulcanized to produce strong snappy vulcanizates without the addition of carbon black or inorganic reinforcing pigments, and far superior to natural rubber in resistance to oxidation and other deteriorating influences, may be prepared by a process which includes broadly the steps of intimately admixing an aqueous dispersion containing small particles of a synthetic rubber, which is a rubbery copolymer of a butadiene-1,3 hydrocarbon, with an aqueous dispersion containing small particles of certain tough synthetic resins, such as polystyrene, in such proportion that the weight of the rubbery copolymer is greater than that of the resin, and simultaneously coagulating (or co-coagulating) the two different kinds of particles in the mixed dispersion. In this manner the small particles of rubbery copolymer and of resin become intimately bound together with the result that the final polymeric material differs widely from a coagulum of the rubbery copolymer alone, from a coagulum of the resin alone, and from a blend prepared by combining, as by milling or mixing in an internal mixer, the two separately coagulated materials.

Accordingly, this invention comprises the above-stated process for preparing combined polymeric materials, and the novel materials obtained thereby. The manner of practicing the process and the character of the polymeric materials, will be apparent from the following detailed description of the synthetic rubber dispersion utilized, the synthetic resin dispersion utilized, and admixing and co-coagulating of the two dispersions and the polymeric materials obtained, and from the specific examples of typical procedures and products hereinbelow set forth.

The synthetic rubber dispersion

As mentioned above the synthetic rubber dispersion utilized is an aqueous dispersion containing small particles of a rubbery butadiene-1,3 hydrocarbon copolymer. Preferably the dispersion is a synthetic rubber latex prepared by the polymerization in aqueous emulsion of a monomer mixture consisting of one or more butadiene-1,3 hydrocarbons together with one or more compounds copolymerizable therewith and containing a single olefinic double bond, the butadiene-1,3 hydrocarbons constituting from about 30 to 90% by weight of the mixture. Examples of butadiene-1,3 hydrocarbons which may be used include butadiene-1,3 itself, isoprene, 2,3-dimethyl-butadiene-1,3 and piperylene; and examples of copolymerizable compounds containing a single olefinic double bond include styrene, alpha-methyl styrene, p-methylstyrene, p-methoxystyrene, m-chlorostyrene, 3,5-dichlorostyrene, p-bromostyrene, vinyl naphthalene and other alkenyl substituted aromatic compounds of the formula

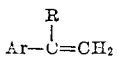

wherein Ar is an aromatic radical having its connecting valence on a ring carbon atom and R is hydrogen or alkyl; acrylonitrile, methacrylonitrile, ethacrylonitrile, alpha-chloro-acrylonitrile, methyl methacrylate, ethyl methacrylate, isobutyl methacrylate, methyl acrylate, propyl acrylate, butyl acrylate, methyl alpha-chloro acrylate, methacrylamide, acrylamide, N,N-diethyl acrylamide and other nitriles, amides and alkyl esters of alpha-methylene aliphatic monocarboxylic acids; diethyl fumarate, diethyl chloromaleate, vinylidene chloride, methyl vinyl ketone, methyl isopropenyl ketone, vinyl pyridines, vinyl furan, vinyl carbazole, vinyl acetate, vinyl methyl ether, isobutylene, ethylene and the like. The emulsion polymerization of such monomer mixtures to form synthetic rubber latices is per se well known to the art, and the precise nature of the mixture is not critical in this invention, but it is preferred to utilize synthetic rubber latices prepared by the polymerization in aqueous emulsion of mixtures containing 50 to 80% by weight of butadiene-1,3 and 20 to 50% by weight of styrene or acrylonitrile since such latices are presently commercially available.

Materials and procedure to be employed in polymerizing such monomer mixtures to form synthetic rubber latices are likewise well known to the art, and are not critical in this invention. In general, the materials used include the following:

| | Parts |
|---|---|
| Monomer mixture | 100 |
| Water | 100 to 300 |
| Emulsifying agent(s) | 1 to 10 |
| Polymerization accelerating substance(s) | 0.1 to 1.0 |
| Polymerization modifier(s) | 0.1 to 1.0 |

(The emulsifying agent is generally a soap such as the soaps of fatty acids or the soaps of hydrogenated or dehydrogenated rosin acids but other materials capable of maintaining the monomer mixture emulsified in the aqueous phase such as alkali metal and ammonium salts of high molecular weight alkyl sulfates and alkaryl sulfonates, mineral acid salts of long chain aliphatic amines and other long-chained aliphatic bases, and the like, may also serve as the emulsifying agent. Polymerization accelerating substances include catalysts or initiators of polymerization, the most useful of which are peroxides and per-salts such as hydrogen peroxide, benzoyl peroxide and potassium persulfate, and also other materials which are used preferably in connection with an initiator to speed up the polymerization, such as simple and complex heavy metal salts, lower aliphatic aldehydes, etc. Polymerization modifiers are substances which increase the plasticity of the resulting polymer and include aliphatic mercaptans, dialkyl dixanthogens and various other sulfur-containing compounds.)

In the preferred polymerization procedure an emulsion is made up from these materials and the monomer mixture is polymerized by agitating the emulsion at a temperature of about 20 to 80° C. for a time, usually about 2 to 40 hours, sufficient to convert a substantial proportion, say from about 40 to 100% by weight, of the monomer mixture into copolymer, a polymerization terminating agent such as hydroquinone or phenyl beta napthylamine or the like being added, if desired, to stop the polymerization at the desired monomer conversion. The resulting synthetic rubber latex may then be treated, if desired, to remove unpolymerized monomers if any and/or to stabilize the rubbery copolymers therein against subsequent oxidation (this is often accomplished by the addition of the polymerization terminating agent which is often also an antioxidant) before its use in this invention.

Synthetic rubber latices so prepared contain from about 25 to 50% by weight of dispersed rubbery copolymer in the form of small particles of an average diameter of about 0.01 to 0.4 micron depending on the recipe used in the polymerization. It is desirable that the size of the particles in the latex used in this invention be as small as is conveniently possible, preferably below about 0.1 micron in average diameter.

Although latices prepared by the emulsion polymerization of the monomer mixtures described are the preferred synthetic rubber dispersions, there may also be utilized other aqueous dispersions in which the dispersed phase contains small particles (less than about 0.5 micron in average diameter) of a rubbery copolymer of a butadiene-1,3 hydrocarbon and a compound copolymerizable therewith and containing a single olefinic double bond, the butadiene-1,3 hydrocarbon content of the copolymer being from about 30 to 90% by weight. Such other dispersions may be prepared, for example, by artificially dispersing such a copolymer which may have been prepared by polymerization by heating or by the use of sodium or in any other manner.

The synthetic resin dispersion

The synthetic resin dispersion which is admixed and co-coagulated with the above-described synthetic rubber dispersion, according to this invention, is preferably a synthetic latex prepared by the polymerization in aqueous emulsion of styrene or other polymerizable alkenyl substituted aromatic compound which possesses a single olefinic double bond linking a carbon atom attached to the aromatic ring to a methylene (CH$_2$) group, that is, a compound of the formula

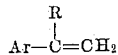

wherein Ar is an aromatic radical having its connecting valence on a ring carbon atom and R is hydrogen or alkyl, either alone or in admixture with each other, and/or in admixture with other polymerizable compounds containing a single olefinic double bond, and/or even in admixture with polymerizable olefinic unsaturated compounds containing more than one olefinic double bond provided that at least 80% by weight of the mixture be composed of polymerizable material containing only one olefinic double bond.

As examples of polymerizable monomeric materials of this nature the following monomers and mixtures of monomers may be cited: (1) styrene, alpha-methyl styrene, p-methyl styrene, 2,4-dimethyl styrene, ortho, para or meta chloro or bromo styrene, 3,5-dichloro styrene, pentachloro styrene, p-cyano styrene, p-methoxy styrene, vinyl naphthalene or the like, by itself (not admixed with any other polymerizable material), (2) monomer mixtures of any desired number of monomers mentioned in (1) in any desired proportions, (3) monomer mixtures containing one or more of the monomers mentioned in (1) together with any desired proportion, but preferably a lesser or equal amount, of one or more copolymerizable compounds containing a single olefinic double bond examples of which compounds include methyl acrylate, methyl methacrylate, acrylonitrile, methacrylamide and other nitriles, amides and alkyl esters of alpha-methylene aliphatic monocarboxylic acids (further specific compounds of this nature are mentioned hereinabove under "The synthetic rubber dispersion"), and also vinyl chloride, vinylidene chloride, methyl isopropenyl ketone, maleic acid or its anhydride, diethyl fumarate, vinyl acetate, vinyl carbazole, methyl vinyl ether, isobutylene, ethylene and the like, and (4) monomer mixtures containing at least 80% by weight of one or more of the monomers mentioned in (1) or at least 80% by weight of the monomers present in the mixtures mentioned in (3) together with less than 20% by weight (preferably from 0.1 to 15% by weight) of a polymerizable material containing more than one olefinic double bond including butadiene-1,3, isoprene, dimethyl butadiene-1,3, piperylene, chloroprene, 3-cyano butadiene-1,3, cyclopentadiene, and other conjugated dienes, and also including polymerizable compounds containing two or more double bonds which are not conjugated such as divinyl benzene, dimethallyl and other hydrocarbons; esters containing at least two olefinic double bonds separated by an ester linkage such as diallyl maleate, allyl cinnamate, diallyl oxalate, di-(2-choroallyl) adipate, trimethallyl phosphate, the dicinnamate of 1,4-dioxanediol-2,3, allyl methacrylate, methallyl acrylate, 2-chloroallyl crotonate, vinyl crotonate, ethylene glycol dimethacrylate and the like and also other compounds of a similar unsaturated nature such as diallyl ketone and dimethallyl ether.

The polymerization of such monomeric materials in aqueous emulsion to form synthetic resin latices is in general quite similar to the polymerization in aqueous emulsion of monomer mixtures containing 30 to 90% of a butadiene-1,3 hydrocarbon to form synthetic rubber latices, which is described hereinabove. Thus, the monomeric material is emulsified in water with the aid of an emulsifying agent, which is preferably a soap but which may also be an emulsifying agent of other types such as those disclosed hereinabove; a polymerization catalyst or initiator such as hydrogen peroxide, benzoyl peroxide or potassium persulfate or the like is preferably included in the emulsion, together if desired with other additions such as polymerization promoters, polymerization modifiers, etc.; and the monomeric material is then polymerized by agitating the emulsion at 20 to 100° C., preferably for a time sufficient to convert substantially all of the monomeric material into resinous polymer.

Synthetic resin latices so prepared contain from about 25 to 50% by weight of dispersed, tough, solid, resinous, saturated, polymeric material of relatively high molecular weight (at least 50,000 and preferably above about 100,000), comprising a polymerized (which term also includes copolymerized) alkenyl substituted aromatic compound which in the monomeric condition possesses the formula

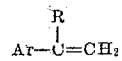

which polymeric material is in the form of small particles of an average diameter of about 0.01 to 0.4 micron. As in the case of the synthetic rubber dispersion, it is preferable that the size of the particles in the synthetic resin dispersion be below about 0.1 micron in average diameter.

The synthetic resin dispersion need not be a latex prepared by polymerization in aqueous emulsion, although such a dispersion is preferred, for it may also be any other aqueous dispersion in which the dispersed phase consists of small particles (less than about 0.5 micron in average diameter) of a resinous polymeric material prepared by polymerization of a monomeric material of the type described. For example, polystyrene which is obtained by polymerization in homogeneous system as by heating monomeric styrene in the presence or absence of catalysts, solvents, diluents, etc., may be reduced to a finely-divided form and dispersed in water with a dispersion agent such as soap, to obtain an aqueous dispersion of polystyrene which may then be utilized in this invention.

*Admixing and co-coagulating the two dispersions*

In the method of this invention the synthetic rubber aqueous dispersion and the synthetic resin aqueous dispersion described hereinabove are intimately admixed and co-coagulated, that is, the synthetic rubber particles and the synthetic resin particles simultaneously coalesce first to form small aggregates consisting of a few particles of each kind, which aggregates progressively combine with other aggregates until they reach a size such as to be no longer dispersed in the aqueous medium.

The quantity of the two dispersions used in forming the mixture is such that the total weight of the resin particles in the resin dispersion is no greater than the weight of the synthetic rubber particles in the synthetic rubber dispersion (that is, from about 1 to 100 parts of synthetic resin to 100 parts of synthetic rubber), but aside from this requirement there is no limit on the amounts of the two dispersions. Thus, the concentration of solid particles in the two dispersions, and hence the total volume of each dispersion used, may be varied widely while still insuring that the proportion of resin particles to synthetic rubber particles is within the required limits.

Admixing of the two dispersions is generally accomplished in the usual manner as by simply pouring one of the dispersions into the other, and then rapidly stirring the mixture for a time sufficient to insure that the resin and rubber particles are substantially uniformly distributed throughout the entire volume of liquid, this requiring generally about 5 minutes or longer depending upon the volume of liquid.

It is preferable that the electrical charge on the particles in each of the two dispersions be of the same nature, that is, that the particles in each of the two dispersions be either positively charged or negatively charged. When anionic emulsifying or dispersing agents such as the fatty acid soaps and such substances as sodium lauryl sulfate, sodium isobutyl naphthalene sulfonate etc. are present in each dispersion, the particles are negatively charged but when cationic emulsifying or dispersing agents such as laurylamine hydrochloride, etc. are present, the particles are positively charged.

However, it is possible in practicing this invention to admix a dispersion containing positively charged particles with a dispersion containing negatively charged particles. In this event co-coagulation occurs on mixing because of the different charges. As a result it is preferable when proceeding in this manner, to commingle turbulently flowing streams of the two dispersions rather than to add one dispersion to a large volume of the other, so that co-coagulation may occur throughout the mass.

In other instances admixing of the dispersions and co-coagulation generally requires two separate steps. The co-coagulating step is carried out in most instances by bringing the mixed dispersion in contact with a coagulating agent as by adding the mixed dispersion to a bath of a liquid coagulating agent, by adding coagulating agents to the mixed dispersion, by dipping a form coated with a coagulant in the dispersion, by bringing together flowing liquid streams of a liquid coagulant and of the mixed dispersion or in any other desired manner.

The coagulating agents employed depend to a large extent upon the nature of the dispersing or emulsifying agents present in the dispersion. When a soap or other alkali metal salt is the dispersing agent, acidic coagulants such as acetic acid, dilute mineral acids such as sulfuric acid and the like may be used and when a cationic emulsifying agent is present bases such as sodium hydroxide and sodium carbonate may be used. Salts such as sodium chloride, calcium chloride, aluminum sulfate and the like are effective coagulants for both acidic and basic dispersions and are particularly effective with dispersions in which the dispersing agent is a fatty acid soap.

Other methods of co-coagulating the mixed dispersion may also be utilized. For example, drying of a layer of the mixed dispersion to form a film or sheet of polymeric material is one method of co-coagulation since the solid particles are thereby coalesced and separated from the aqueous medium, although no chemical coagulating agent is required.

Compounding ingredients may be added to the mixed dispersion before co-coagulation or to either the synthetic rubber dispersion or the synthetic resin dispersion before admixing, if desired. Among such compounding ingredients there may be mentioned softeners or plasticizers, which are sometimes advantageously mixed with the synthetic resin dispersion before its admixture with the synthetic rubber dispersion, other resinous or rubbery materials, pigments, fillers, colors, stabilizing agents, antioxidants, vulcanizing agents, etc. In adding such materials the addition of solids in dispersion and addition of liquids in emulsion or solution, is preferred. The advisability of including such compounding ingredients will depend primarily upon cost factors and the use to be made of the finished product, it being understood that the presence or absence of compounding ingredients is in no way critical in this invention.

*The polymeric materials obtained*

Upon co-coagulation of the dispersion of synthetic rubber with the dispersion of synthetic resin, polymeric materials comprising a major proportion of a rubbery copolymer of a butadiene-1,3 hydrocarbon with a copolymerizable compound containing a single olefinic double bond, intimately and uniformly combined with a minor proportion of a tough solid resinous polymer comprising a polymerized alkenyl substitute aromatic compound, preferably polystyrene, are obtained in the form of crumbs or as sheets or films, depending on the particular method of co-coagulation. When obtained in crumb form, as is ordinarily the case when a liquid coagulant is utilized, the polymeric material is preferably separated from the aqueous medium, washed to remove occluded dispersing agent, if desired, and then, after being knitted together into a sheet if desired, is ready to be dried and used in the manner customary in the rubber factory.

These polymeric materials comprise small particles of the synthetic resin substantially completely covered with or embedded in the synthetic rubber, and hence they possess an entirely different physical structure than can be obtained by mixing the solid synthetic rubber with the solid synthetic resin. In some instances the resin may be partially soluble or swellable in the synthetic rubber, and in such instances the resin particles may be partially dissolved or swelled by the surrounding synthetic rubber, but nevertheless solution throughout the synthetic rubber is not complete since these polymeric materials differ from materials prepared by mixing solutions of the synthetic rubber and of the resin, and then removing the solvent. In most instances the resin is not soluble or swellable by the synthetic rubber, and in such instances the small particles of resin are uniformly dispersed in the body of synthetic rubber so that the polymeric material is definitely heterogeneous, but the dispersion is much more uniform and the particles of dispersed resin are much smaller than can be obtained by milling powdered resin into the solid synthetic rubber.

When the polymeric materials of this invention comprise from about 5 to 80 parts, preferably from about 15 to 60 parts, of the synthetic resin to each 100 parts of the synthetic rubber, and are substantially free from added fillers and pigments, they resemble raw natural rubber in appearance and in physical properties. They are soft and plastic when unvulcanized and may be easily subjected to the usual processing operations such as calendering, extruding, etc. They possess a considerably higher tensile strength and higher elasticity when vulcanized in a "pure gum" recipe than do butadiene synthetic rubbers, yet such vulcanizates are quite soft and flexible possessing a modulus of elasticity at any given elongation about the same as that of vulcanized pure gum natural rubber. As a result they may be used to produce many articles such as nursing nipples, rubber thread, stationers' bands, shoe uppers, surgical goods, etc., which are superior to those made from butadiene synthetic rubber because they are stronger and more elastic yet are not too stiff for the intended purpose. Additionally, these materials may be easily mixed with softeners, fillers, pigments, vulcanizing ingredients, etc. without "sticking" to the mixing rolls, differing in this respect from butadiene synthetic rubbers compounded in the latex state with inorganic reinforcing pigments and then coagulated. They may be vulcanized to produce compositions useful for the same multifarious purposes as are other rubbery materials, and such compositions are superior to similar compositions made from butadiene synthetic rubber not containing a co-coagulated resin, since they are stronger and more elastic; and are superior to similar compositions made from natural rubber since they are more resistant to oxidation and ozone, to water, to oils and chemicals, and to other influences which degrade natural rubber. Such compounded materials are particularly useful in applications where the presence of carbon black is undesirable as in electrical insulation and in white compositions, such as for white sidewalls for tires, and brightly colored decorative rubbery compositions, since such compositions are considerably stronger than it has heretofore been possible to obtain in butadiene synthetic rubbers without the use of carbon black. Such materials compounded with carbon black, for use in a tire tread or carcass for example, are also superior to similar compositions made from butadiene synthetic rubber not containing co-coagulated resin, since they possess higher strength, or lower hysteresis or greater resistance to flex-cracking, depending upon the amount of carbon black utilized.

When the polymeric materials of this invention comprise from about 80 to 100 parts of the synthetic resin to each 100 parts of the synthetic rubber, they are still rubbery in the sense that they are vulcanizable and somewhat elastic, but they are stiffer and more leathery when vulcanized. Such materials are quite useful for shoe soling and numerous other applications.

*Specific examples*

The following specific examples (in which the parts are by weight unless otherwise indicated) serve to illustrate the invention in greater detail, but it will be understood, from the foregoing description, that the invention is by no means limited thereto.

EXAMPLE 1

A synthetic rubber latex containing about 29.5% by weight of a rubbery copolymer of butadiene-1,3 and styrene, in the form of particles of about 0.08 micron in diameter, dispersed in an aqueous soap solution, is prepared by copolymerizing a monomeric mixture consisting of 75 parts of butadiene-1,3 and 25 parts of styrene in an aqueous emulsion also containing 180 parts of water, 5 parts of fatty acid soap, 0.30 part of potassium persulfate and 0.50 part of n-dodecyl mercaptan at a temperature of 50° C. for a time sufficient to convert about 75% of the monomers into copolymer, and then adding 2 parts of emulsified phenyl beta naphthylamine and removing the unpolymerized monomers.

To 340 parts of this synthetic rubber latex (100 parts of the rubbery copolymer) there is then added with continued stirring about 73 parts of a synthetic resin latex containing about 35% by weight of polystyrene (about 25.5 parts) in the form of particles of about 0.08 micron in diameter, dispersed in a soap solution, the synthetic resin latex having previously been prepared by polymerizing 100 parts of monomeric styrene in an aqueous emulsion also containing 180 parts of water, 5 parts of fatty acid soap, 0.3 part of potassium persulfate and 0.15 part of n-dodecyl mercaptan at a temperature of 50° C. until substantially all (94%) of the monomer is converted into polymer. The resulting mixed latex is then stirred for an additional 5 minutes or longer to insure uniform blending of the synthetic rubber and synthetic resin particles throughout the mass of liquid. A stream of the mixed latex and a separate stream of 2% aqueous sulfuric acid are then simultaneously added with stirring to a tank containing a 5% aqueous salt solution, whereupon co-coagulation of the synthetic rubber particles and the synthetic resin particles occurs and finely-divided crumbs of polymeric material are formed. These crumbs are then separated from the surrounding aqueous medium, are washed repeatedly and finally formed into a sheet on a wash mill, the sheet of polymeric material then being dried.

The polymeric material obtained (which contains 100 parts of the rubbery butadiene-1,3 styrene copolymer intimately admixed with 25.5 parts of polystyrene) is compounded in a "pure gum" recipe with 5 parts of zinc oxide, 5 parts of a tarry softener, 1.5 parts of fatty acid, 1.2 parts of benzothiazyl-2 monocyclohexyl sulfenamide (a vulcanization accelerator) and 2.0 parts of sulfur, and is then vulcanized at 280° F. A soft, snappy vulcanizate resembling pure gum natural rubber vulcanizates is obtained; it possesses a tensile strength over 1,000 lbs./sq. in. and an ultimate elongation over 700%; yet its modulus of elasticity at 300% elongation is below 300 lbs./sq. in. The tensile strength of a similar "pure gum" vulcanizate of the same butadiene-1,3 styrene copolymer, not containing co-coagulated polystyrene, is only about 300 lbs./sq. in.; its elongation is less than 400%; and its 300% modulus of elasticity is about 225 lbs./sq. in. It is thus apparent that the presence of co-coagulated polystyrene greatly improves the strength and elasticity of the synthetic rubber without substantially increasing its stiffness, thereby rendering it more like natural rubber. The hysteresis loss of the vulcanizate containing co-coagulated polystyrene is also less and its resistance to flex cracking is greater than that of a vulcanizate of the same strength compounded with carbon black and not containing co-coagulated polystyrene. These improvements, however, cannot be secured by milling polystyrene into the synthetic rubber during compounding. Thus, when 25.5 parts of polystyrene (prepared as above except that the latex is separately coagulated) are milled into 100 parts of the butadiene-1,3 styrene copolymer and the blend then compounded in the same "pure gum" recipe as above and vulcanized, the vulcanizate possesses a tensile strength of only 500 lbs./sq. in. and an ultimate elongation of 350%.

EXAMPLE 2

The procedure of Example 1 is repeated except that the butadiene-1,3 styrene copolymer latex and the polystyrene latex are admixed in a proportion such that 54 parts of polystyrene are present for each 100 parts of the butadiene-1,3 styrene copolymer. The polymeric material obtained is vulcanized as in Example 1 to produce a vulcanizate which is stiffer and of higher modulus than that of Example 1 but which possesses a tensile strength of about 2,000 lbs./sq. in. and an ultimate elongation of above 500%. This polymeric material is derived from substantially equal proportions of butadiene-1,3 and styrene (the copolymerized styrene content of the 100 parts of butadiene-1,3 styrene copolymer is 23 parts which added to the 54 parts of polystyrene gives 77 parts derivable from styrene, an amount equal to the copolymerized butadiene content of the copolymer), but it differs greatly from a copolymer of butadiene-1,3 and styrene in which the butadiene-1,3 and styrene contents are equal, since such a copolymer when vulcanized in the same "pure gum" recipe possesses a tensile strength of only about 400 lbs./sq. in. Thus, it is apparent that the advantages of this invention are not obtainable by copolymerization alone, but are dependent upon the presence of separate molecules of the synthetic rubber and the synthetic resin.

EXAMPLE 3

The procedure of Example 1 is again repeated except that the synthetic resin latex is prepared by polymerization of a monomer mixture consisting of 75 parts of styrene and 25 parts of methyl methacrylate, instead of by the polymerization of 100 parts of styrene, the polymerization to form the resin latex and the resin latex itself being otherwise the same as in Example 1. The polymeric material obtained, consisting of the co-coagulum from 100 parts of rubbery copolymer of butadiene-1,3 and 25.5 parts of resinous copolymer of styrene and methyl methacrylate, is capable of being vulcanized in a "pure gum" recipe to a soft snappy vulcanizate of a tensile strength above 1,000 lbs./sq. in. and is otherwise generally equivalent in properties to the material of Example 1. This example illustrates the use of a synthetic resin latex prepared by the polymerization in aqueous emulsion of a monomer mixture composed of compounds containing a single olefinic double bond and comprising an alkenyl substituted aromatic compound such as styrene. Other examples using other synthetic resin latices of this type also give results generally equivalent to those of this example.

EXAMPLE 4

A synthetic resin latex is prepared by the polymerization in aqueous emulsion (in the same manner as in the preparation of polystyrene latex in Example 1) of a monomer mixture consisting of 85 parts of styrene and 15 parts of butadiene-1,3, and this latex is substituted for the polystyrene latex of Example 1 in the procedure therein set forth in such proportion that 29.5 parts of resin are present for each 100 parts of rubbery copolymer. The polymeric material obtained on co-coagulation consists of an intimate admixture of 100 parts of rubbery copolymer of 75 butadiene-1,3 and 25 styrene with 29.5 parts of a resinous copolymer of 85 styrene and 15 butadiene-1,3. When vulcanized in the "pure gum" recipe of Example 1 this polymeric material possesses a tensile strength of about 2,000 lbs./sq. in., an ultimate elongation of about 650% and a modulus of elasticity at 300% elongation of about 300 lbs./sq. in. A 75:25 butadiene-1,3 styrene copolymer without co-coagulated resin compounded in the same recipe except that an amount of carbon black equal to the volume of resin used above is also added, possesses only slightly higher tensile strength, about the same elongation and a considerably higher 300% modulus. When carbon black is also used in compounding the polymeric material of this example, vulcanizates are obtained which possess a tensile strength as high as 5,000 lbs./sq. in., yet are considerably less stiff and more resistant to flex cracking than are vulcanizates of equal strength of the rubbery copolymer containing carbon black but no co-coagulated resin.

This example illustrates the use of a synthetic resin latex prepared by the polymerization in aqueous emulsion of a monomer mixture containing styrene and in which at least 80% by weight of the constituents contain a single olefinic double bond, and also containing a small amount, less than 20% by weight, of constituents containing more than one olefinic double bond. When such resin latices are employed the polymeric materials obtained are generally somewhat superior in strength to those obtained with resin latices of the type illustrated in the preceding examples. The use of a resin latex prepared by the polymerization in aqueous emulsion of a mixture of 80 to 99 parts of styrene with from 1 to 20 parts of divinyl benzene (or other copolymerizable compound containing two or more non-conjugated olefinic bonds) produces a polymeric material even stronger and more elastic than the material of this example. The resin contained in such a latex is insoluble in rubbery butadiene-1,3 styrene copolymers as well as in other hydrocarbons, and cannot be added thereto on a mill or in a solution, but by the procedure of this invention a uniform dispersion of small particles of the insoluble resin in the rubbery copolymer is secured.

EXAMPLES 5 TO 7

In these examples a synthetic rubber latex, containing about 28% by weight of small particles about 0.1 micron in diameter of a rubbery copolymer of butadiene-1,3 and acrylonitrile, is prepared by polymerizing a monomer mixture consisting of 55 parts of butadiene-1,3 and 45 parts of acrylonitrile in an aqueous emulsion also containing 250 parts of water, 5 parts of fatty acid soap, 0.3 part of hydrogen peroxide, about 0.1 part of complex pyrophosphates of iron and cobalt, and 0.6 part of diisopropyl dixanthogen, at a temperature of 30° C. until substantially all of the monomeric material is converted to polymer, and then adding 3 parts of emulsified heptylated diphenyl amine. Portions of this latex are then mixed with portions of a synthetic resin latex, containing about 33% by weight of a resinous copolymer of styrene and butadiene-1,3 in the form of small particles of about 0.1 micron in diameter, prepared by the polymerization in aqueous emulsion of a mixture of 95 parts of styrene and 5 parts of butadiene-1,3 in an aqueous emulsion also containing 200 parts of water, 10 parts of fatty acid soap, and 0.3 part of potassium persulfate at a temperature of 50° C. for a time sufficient for all of the monomeric material to be converted into copolymer. The proportions of the two latices are such that 12 parts (Example 5), 27 parts (Example 6) and 47 parts (Example 7) respectively of the resin are present for each 100 parts of the rubbery copolymer. The mixed latices are then co-coagulated as in Example 1 and the resulting polymeric materials washed and dried.

The polymeric materials are then compounded with 5 parts of zinc oxide, 5 parts of a tarry softener, 10 parts of litharge and 2.75 parts of sulfur, all for each 100 parts of butadiene-1,3 acrylonitrile copolymer in the polymeric material and then vulcanized for 30 minutes at 307° F. The tensile strength, ultimate elongation and 300% modulus of elasticity for each of the polymeric materials, together with the corresponding properties for the butadiene-1,3 acrylonitrile copolymer with no co-coagulated resin, are as follows:

|  | Parts Co-coagulated Resin | Tensile (lbs./sq. in.) | Elongation | 300% Modulus (lbs./sq. in.) |
|---|---|---|---|---|
| Control | 0 | 625 | 530 | 200 |
| Example 5 | 12 | 1,675 | 730 | 225 |
| Example 6 | 27 | 2,500 | 850 | 450 |
| Example 7 | 47 | 1,675 | 740 | 850 |

These examples show that results similar to those obtained with butadiene-1,3 styrene synthetic rubbers are also secured with butadiene-1,3 acrylonitrile synthetic rubbers.

Numerous other examples also show that similar results are secured when still other modifications and variations are made in the synthetic rubber dispersion, in the synthetic resin dispersion and in the procedure employed for admixing and co-coagulating the two dispersions, all as set forth hereinabove. Accordingly, the invention is not limited to the details of the examples given but only as required by the spirit and scope of the appended claims.

I claim:

1. The method of preparing rubbery vulcanizable polymeric material which comprises intimately admixing and co-coagulating two separately prepared aqueous dispersions, particles in each of which possess an average diameter below 0.5 micron, one of which is an aqueous dispersion of a rubbery copolymer of 50 to 90% by weight of butadiene-1,3 and the remainder of a copolymerizable compound containing a single olefinic double bond and selected from the class consisting of styrene and acrylonitrile, and the other of which is an aqueous dispersion of a tough, solid, resinous polymeric material of a molecular weight above 50,000 and selected from the class consisting of polystyrene, copolymers of styrene with a lesser amount of a copolymerizable compound containing as its sole unsaturation a single olefinic double bond, and copolymers of 80 to 99% by weight of styrene and the remainder of a polymerizable material containing more than one olefinic double bond and selected from the class consisting of butadiene-1,3 and divinyl benzene, the said two dispersions being present in such proportions as to provide a mixture in which the amount of the said resinous polymeric material is from 5 to 80% by weight of that of the said rubbery copolymer.

2. The method of preparing rubbery vulcanizable polymeric material which comprises intimately admixing and co-coagulating two separately prepared aqueous dispersions, particles in each of which possess an average diameter below 0.5 micron, one of which is an aqueous dispersion of a rubbery copolymer of 50 to 90% by weight of butadiene-1,3 and the remainder of a copolymerizable compound containing a single olefinic double bond and selected from the class consisting of styrene and acrylonitrile, and the other of which is an aqueous dispersion of a tough, solid, resinous polymeric material of a molecular weight above 50,000 and selected from the class consisting of polystyrene, copolymers of styrene with a lesser amount of a copolymerizable compound containing as its sole unsaturation a single olefinic double bond, and copolymers of 80 to 99% by weight of styrene and the remainder of a polymerizable material containing more than one olefinic double bond and selected from the class consisting of butadiene-1,3 and divinyl benzene, the said two dispersions being present in such proportions as to provide a mixture in which the amount of the said resinous polymeric material is from 15 to 60% by weight of that of the said rubbery copolymer.

3. The method of claim 2 wherein the rubbery copolymer is a copolymer of 50 to 90% by weight of butadiene-1,3 and the remainder of acrylonitrile and the resinous polymeric material is a copolymer of 80 to 90% by weight of styrene and the remainder of butadiene-1,3.

4. The method of claim 2 wherein the rubbery copolymer is a copolymer of 50 to 90% by weight of butadiene-1,3 and the remainder of styrene and the resinous polymeric material is polystyrene.

5. The method of claim 2 wherein the rubbery copolymer is a copolymer of 50 to 90% by weight of butadiene-1,3 and the remainder of styrene and the resinous polymeric material is a copolymer of 80 to 99% by weight of styrene and the remainder of butadiene-1,3.

6. The method of claim 2 wherein the rubbery copolymer is a copolymer of 50 to 90% by weight of butadiene-1,3 and the remainder of styrene and the resinous polymeric material is a copolymer of 80 to 99% by weight of styrene and the remainder of divinyl benzene.

7. The method of preparing a rubbery polymeric material which is vulcanizable with sulfur to a tensile strength above 1,000 lbs./sq. in. without being compounded with carbon black, which comprises intimately admixing and co-coagulating two separately prepared aqueous dispersions, one of which is a latex of a rubbery copolymer of 50 to 90% by weight of butadiene-1,3 and the remainder of acrylonitrile and the other of which is a latex of hard, tough, resinous polystyrene of molecular weight above 100,000, the said two dispersions being present in such proportions as to provide a mixture in which the amount of the polystyrene is from 15 to 60% by weight of that of the copolymer of butadiene-1,3 and acrylonitrile.

8. A rubbery vulcanizable polymeric material prepared by the method of claim 1.

9. A rubbery polymeric material vulcanizable with sulfur to a tensile strength above 1,000 lbs./sq. in. without being compounded with carbon black, said polymeric material being prepared by the method of claim 2.

10. A rubbery polymeric material vulcanizable with sulfur to a tensile strength above 1,000 lbs./sq. in. without being compounded with carbon black, said polymeric material being prepared by the method of claim 7.

GEORGE L. WHEELOCK.

REFERENCES CITED

The following references are of record in the file of this patent:

UNITED STATES PATENTS

| Number | Name | Date |
|---|---|---|
| 2,195,827 | Ryan | Apr. 2, 1940 |
| 2,388,685 | Guss | Nov. 13, 1945 |
| 2,414,803 | D'Alelio | Jan. 28, 1947 |
| 2,419,202 | D'Alelio | Apr. 22, 1947 |
| 2,460,300 | Le Fevre et al. | Feb. 1, 1949 |

FOREIGN PATENTS

| Number | Country | Date |
|---|---|---|
| 412,301 | Great Britain | June 28, 1934 |

OTHER REFERENCES

Winklemann: India Rubber World, March 1946, pages 799–801.

Marmix, 13 page publication of Marbon Corp., Gary, Ind., received by Patent Office, April 8, 1946.

Bacon el al.: Proceedings of Rubber Tech. Conference, London, 1938, pages 525–536.

Official Digest #240, November 1944, pp. 501, 504–510.

Kolthoff et al.: Rubber Chem. and Tech., April 1947, pp. 546–550.

India Rubber World, January 1945, page 452.

Modern Plastics, July 1948, page 93.